United States Patent
Robertson

(10) Patent No.: US 12,325,364 B1
(45) Date of Patent: Jun. 10, 2025

(54) UNIVERSAL CAMERA MOUNT ASSEMBLY FOR A MOTOR VEHICLE

(71) Applicant: Ford Global Technologies, LLC, Dearborn, MI (US)

(72) Inventor: Tom Robertson, Kew (AU)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 18/439,833

(22) Filed: Feb. 13, 2024

(51) Int. Cl.
  *B60R 11/04* (2006.01)
  *B60K 35/10* (2024.01)
  *B60K 37/00* (2024.01)

(52) U.S. Cl.
  CPC .............. *B60R 11/04* (2013.01); *B60K 35/10* (2024.01); *B60K 37/00* (2013.01)

(58) Field of Classification Search
  CPC .......... B60R 11/04; B60K 35/10; B60K 37/00
  See application file for complete search history.

(56) References Cited

U.S. PATENT DOCUMENTS

| | | | | |
|---|---|---|---|---|
| 6,762,790 B1* | 7/2004 | Matko | ..................... | F16M 11/10 |
| | | | | 396/428 |
| 9,726,044 B2 | 8/2017 | Stevens et al. | | |
| 2010/0194885 A1* | 8/2010 | Plaster | .................... | B60R 25/10 |
| | | | | 348/148 |
| 2012/0044337 A1* | 2/2012 | Mauderer | ................. | B60R 1/29 |
| | | | | 348/E5.024 |
| 2014/0204193 A1* | 7/2014 | Zhang | .................... | G06V 40/18 |
| | | | | 348/78 |
| 2015/0054933 A1* | 2/2015 | Wasiek | ..................... | B60R 1/12 |
| | | | | 348/77 |
| 2020/0180521 A1* | 6/2020 | Yachida | .................. | B60R 11/04 |
| 2021/0056306 A1* | 2/2021 | Hu | ......................... | G06F 18/217 |
| 2022/0121865 A1* | 4/2022 | Austin | ................. | G06V 40/193 |
| 2025/0121843 A1* | 4/2025 | Avadhanam | .......... | G06V 40/18 |

FOREIGN PATENT DOCUMENTS

JP          2009107393 A     *  5/2009

* cited by examiner

*Primary Examiner* — Michael Lee
(74) *Attorney, Agent, or Firm* — Vichit Chea; Price Heneveld LLP

(57) ABSTRACT

A camera mount assembly for a motor vehicle having a base configured to be installed on the vehicle and having a recess on a top surface and a carrier assembled above the base. The carrier has a first camera mount and a second camera mount. The first camera mount has a first protrusion extending on the bottom side. The second camera mount has a second protrusion extending on the bottom side. The camera mount also has a camera configured to be installed onto one of the first and second camera mounts. The camera is received into one of the first and second camera mounts when a corresponding one of the first and second protrusion extends into the recess in the base, and the other of the first and second protrusions contacts the base and prevents installation of the camera in the other of the first and second camera mounts.

20 Claims, 5 Drawing Sheets

UNIVERSAL CAMERA MOUNT ASSEMBLY FOR A MOTOR VEHICLE

FIELD OF THE DISCLOSURE

The present disclosure generally relates to vehicle imaging systems, and more particularly relates to a camera mount assembly for accommodating different camera arrangements on a motor vehicle.

BACKGROUND OF THE DISCLOSURE

Motor vehicles are commonly equipped with imaging devices to monitor the occupants in a vehicle in support of advanced vehicle level functions. For example, a driver monitoring camera can be employed to monitor the state of the driver for autonomous driving applications. Typically, the driver monitoring camera is mounted forward of the driver seat generally in a location suitable to track the driver's eye movement and including the facial characteristics of the driver. It would be desirable to provide for a camera mount assembly that easily accommodates different vehicle configurations and to accommodate drivers on the left- or right-hand sides of the vehicle.

SUMMARY OF THE DISCLOSURE

According to a first aspect of the present disclosure, a camera mount assembly for a motor vehicle has a base configured to be installed on the vehicle and a recess on a top surface and a carrier assembled above the base. The carrier has a first camera mount and a second camera mount. The first camera mount has a first protrusion extending on the bottom side, the second camera mount has a second protrusion extending on the bottom side, and a camera configured to be installed onto one of the first and second camera mounts, wherein the camera is received into one of the first and second camera mounts when a corresponding one of the first and second protrusions extends into the recess in the base. The other of the first and second protrusions contacts the base and prevents installation of the camera in the other of the first and second camera mounts.

Embodiments of the first aspect of the present disclosure can include any one or a combination of the following features:
- the first camera mount has a first opening having a first finger extending from the carrier within the opening and coupled to the first protrusion, and wherein the second camera mount has a second opening having a second finger extending from the carrier within the opening and coupled to the second protrusion;
- the first finger is connected to the carrier via a first living hinge, and the second finger is connected to the carrier via a second living hinge;
- the recess comprises a hole extending through the base;
- the recess extends below one of the first and second camera mounts and not below the other of the first and second camera mounts;
- the first camera mount has a first pair of connector features configured to receive the camera assembly, and the second camera mount has a second pair of connector features configured to receive the camera assembly;
- the camera mount assembly is assembled onto an instrument panel of the vehicle;
- the camera mount assembly is located on the instrument panel midway between first and second seat assemblies; and
- the camera is a driver state monitoring camera.

According to a second aspect of the present disclosure, a camera mount assembly for a motor vehicle has a base configured to be installed on the vehicle and has a recess on a top surface and a carrier assembled above the base. The carrier has a first camera mount and a second camera mount. The first camera mount has a first camera mount with a first protrusion extending on the bottom side, the second camera mount has a second camera mount with a second protrusion extending on the bottom side. The first camera mount has a first opening having a first finger extending from the carrier within the opening and coupled to the first protrusion, wherein the second camera mount has a second opening having a second finger extending from the carrier within the opening and coupled to the second protrusion. The camera mount assembly also has a driver monitoring camera configured to be installed onto one of the first and second camera mounts, wherein the camera is received into one of the first and second camera mounts when a corresponding one of the first and second protrusions extends into the recess in the base, wherein the other of the first and second protrusions contacts the base and prevents mounting of the camera in the other of the first and second camera mounts, and wherein the camera mount assembly is located on an instrument panel of the vehicle.

Embodiments of the second aspect of the present disclosure can include any one or a combination of the following features:
- the first finger is connected to the carrier via a first living hinge, and the second finger is connected to the carrier via a second living hinge;
- the recess comprises a hole extending through the base;
- the recess extends below one of the first and second camera mounts and not below the other of the first and second camera mounts;
- the first camera mount comprises a first pair of features configured to receive the camera, and the second camera mount comprises a second pair of features configured to receive the camera mount; and
- the camera mount assembly is located on the instrument panel midway between first and second seat assemblies.

Another aspect of the present disclosure is a method for assembling a camera on a camera mount on a vehicle. The method includes installing a base on the vehicle, the base having a recess on a top surface. The method also includes assembling a carrier above the base, the carrier having a first camera mount and a second camera mount, the first camera mount having a first protrusion extending on the bottom side, and the second camera mount having a second protrusion extending on the bottom side. The method further includes installing a camera onto one of the first and second camera mounts, wherein the camera is received into one of the first and second camera mounts when a corresponding one of the first and second protrusions extends into the recess in the base, and wherein the other of the first and second protrusions contacts the base and prevents mounting of the camera in the other of the first and second camera mounts.

Embodiments of the third aspect of the present disclosure can include any one or a combination of the following features:
- the first camera mount comprises a first opening having a finger extending from the carrier within the opening and coupled to the first protrusion, and wherein the second camera mount comprises a second opening having a finger extending from the carrier within the opening and coupled to the second protrusion;

the first finger is connected to the carrier via a first living hinge, and the second finger is connected to the carrier via a second living hinge;

the camera mount assembly is assembled onto an instrument panel of the vehicle; and the camera is a driver monitoring camera.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
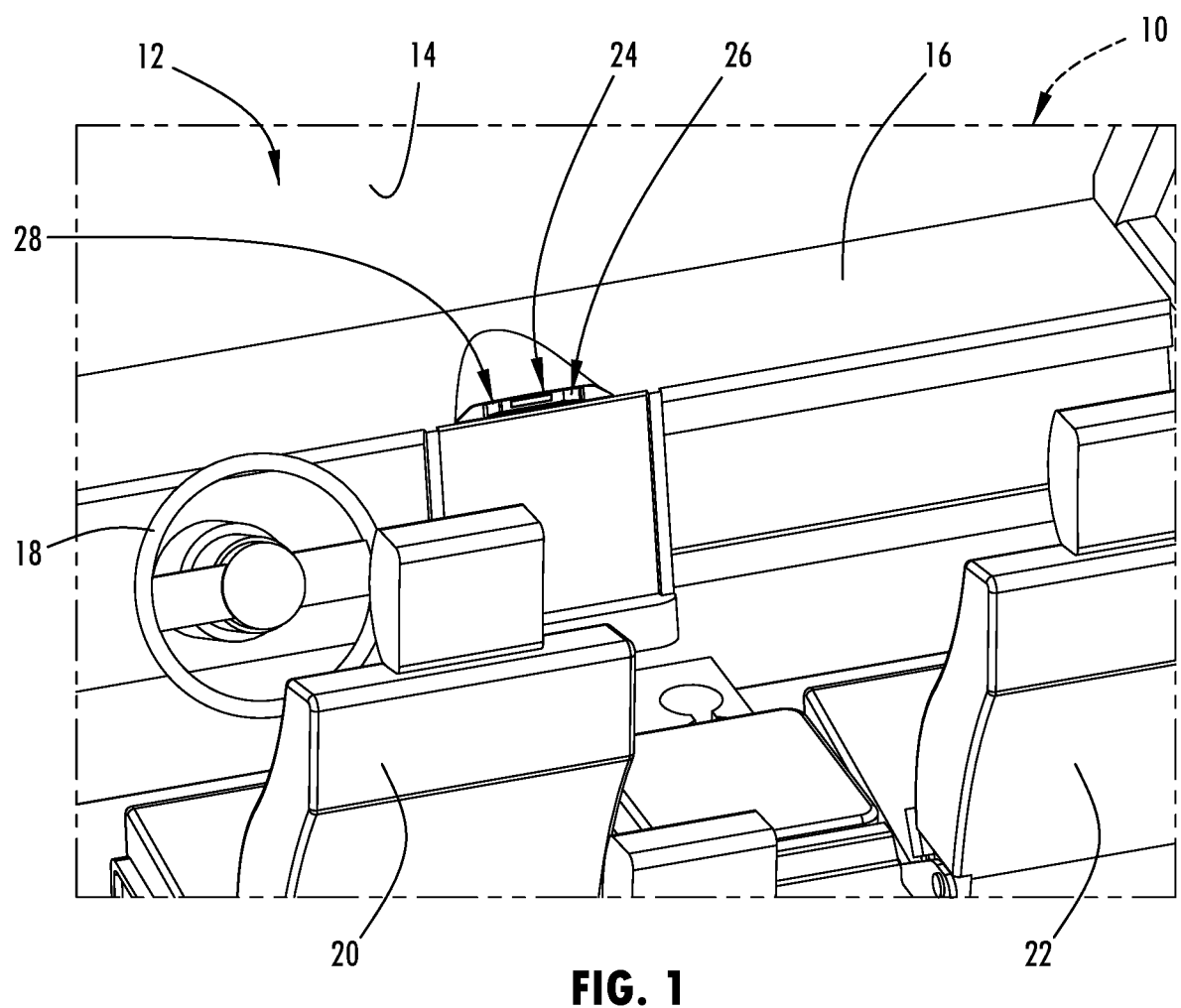
FIG. 1 is a forward-looking view of the front portion of an interior cabin of a motor vehicle having a left-hand driver monitoring system with a camera on a camera mount assembly arranged to monitor a left side driver, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a universal camera mount assembly for a motor vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10, such as a wheeled automotive or motor vehicle, is generally illustrated having a cabin interior 12 also referred to as a passenger compartment which is generally defined by a body of the motor vehicle 10. At the front end of the cabin interior 12 is a windshield 14 which generally defines a front side of the cabin interior 12. The cabin interior 12 generally includes passenger seating, including a front row of seating having a left side seat 20 configured as a driver seat and a right side seat 22 configured as a passenger seat. The driver seat is shown located on the left-hand side of the motor vehicle 10, and the passenger seat is shown located on the right-hand side of the motor vehicle 10. A steering wheel 18 is generally located forward of the left side seat 20 to allow the driver to steer the motor vehicle 10. An instrument panel 16 is arranged generally located in the cabin interior 12 forward of both the left side and right side seats 20 and 22 proximate to and vehicle rearward of a lower portion of the windshield 14. The instrument panel 16 may be a trim panel and may also be referred to as a dashboard.

The motor vehicle 10 is equipped with a universal camera mount assembly 24 which is shown located generally on the instrument panel 16, such as on a trim panel which may have a topper pad of the instrument panel 16 at a location generally forward of the left side seat 20 and right side seat 22 and generally in a position between the left side seat 20 and the right side seat 22. The camera mount assembly 24 provides a mounting arrangement for receiving an imaging device in the form of a camera, such as a video camera, that may capture images of the seating region configured to hold the driver of the motor vehicle 10. The captured images may be processed using image processing with an image processor to determine characteristics of a person, namely a driver of the motor vehicle 10 seated in the driver configured seat. Specifically, the captured images may include images of the head, face, shoulders, and arms of the driver of the motor vehicle 10. The determined characteristics may include head and eye orientation and whether the eyes are open or closed, which can be used for detecting driver distraction, sleepiness, or other driver states, for example. By processing the images of the driver of the motor vehicle 10, the state of the driver of the motor vehicle 10 may be determined based on the determined characteristics and the determined state of the driver used for one or more applications.

The camera mount assembly 24 is generally shown located forward and midway between the left side seat and the right side seat 22, according to one example shown. It should be appreciated that in the vehicle configuration shown in FIG. 1, the left side seat 20 is shown configured as the driver seat in the cabin interior 12 of the motor vehicle 10. However, it should be appreciated that the driver seat may be located on the right side of the motor vehicle 10 such that the right side seat 22 may serve as the driver seat. As such, the motor vehicle 10 may be configured as either a left side driver seat vehicle or a right side driver seat vehicle. The camera mount assembly 24 provides a universal mount arrangement which allows for a common carrier assembly to be employed to mount a driver monitoring camera on the appropriate location for either left or right side driver configured vehicles and to prevent the assembly of an incorrect camera mounting arrangement.

The camera mount assembly 24 has a left side driver monitoring camera location 26 generally shown on the right side of the camera mount assembly 24 and a right side driver monitoring camera 28 generally shown located on the left side of the camera mount assembly 24. When the left side seat 20 is configured as the driver seat, a camera 60 is mounted in the left side driver monitoring camera location 26. For a vehicle in which the right side seat 22 is configured as the driver seat, the camera 60 is mounted at the right side driver monitoring camera location 28.

Figure 2:
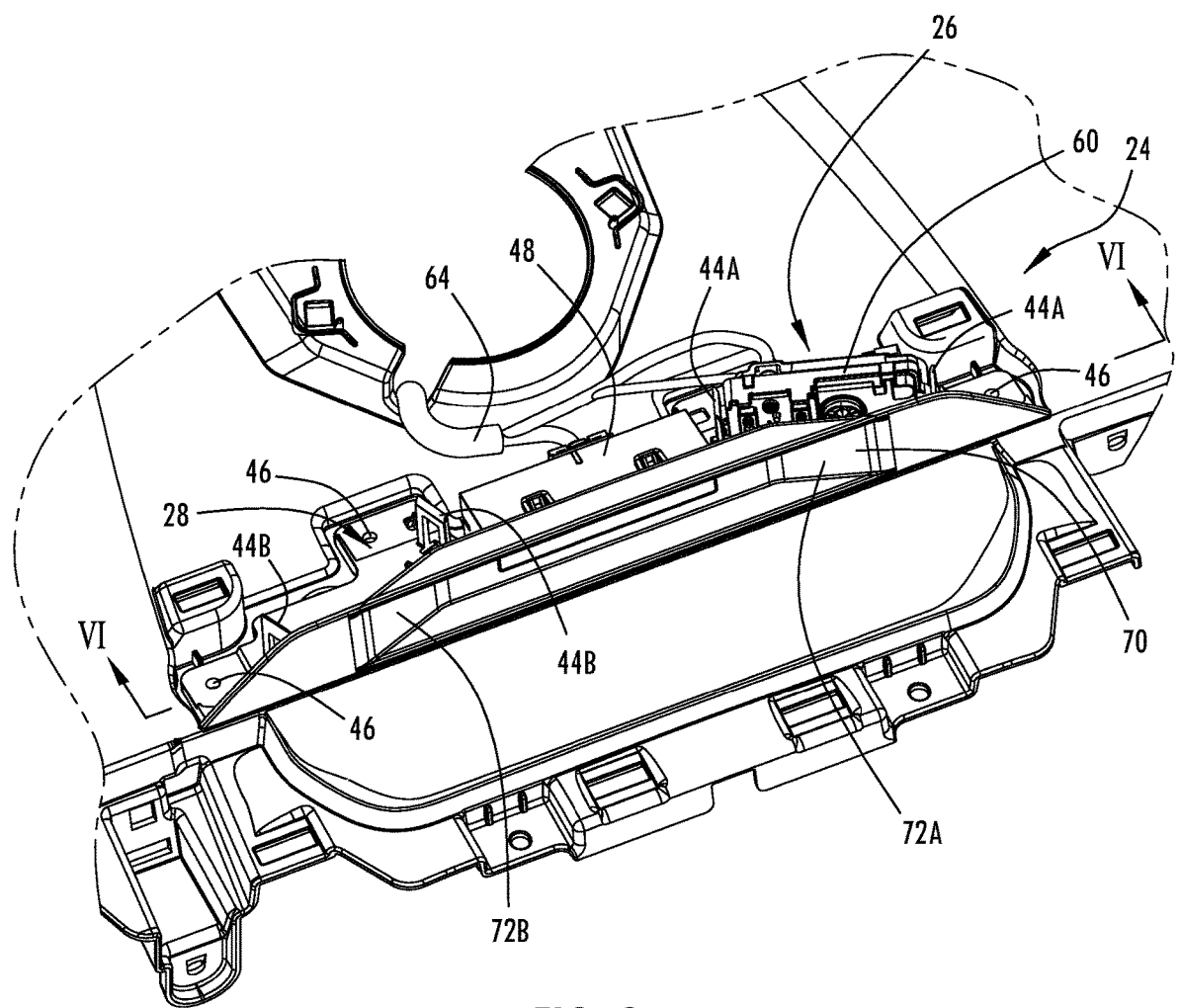
FIG. 2 is an upper perspective view of the driver monitoring camera on the camera mount assembly for the camera arrangement of FIG. 1.
Figure 3:
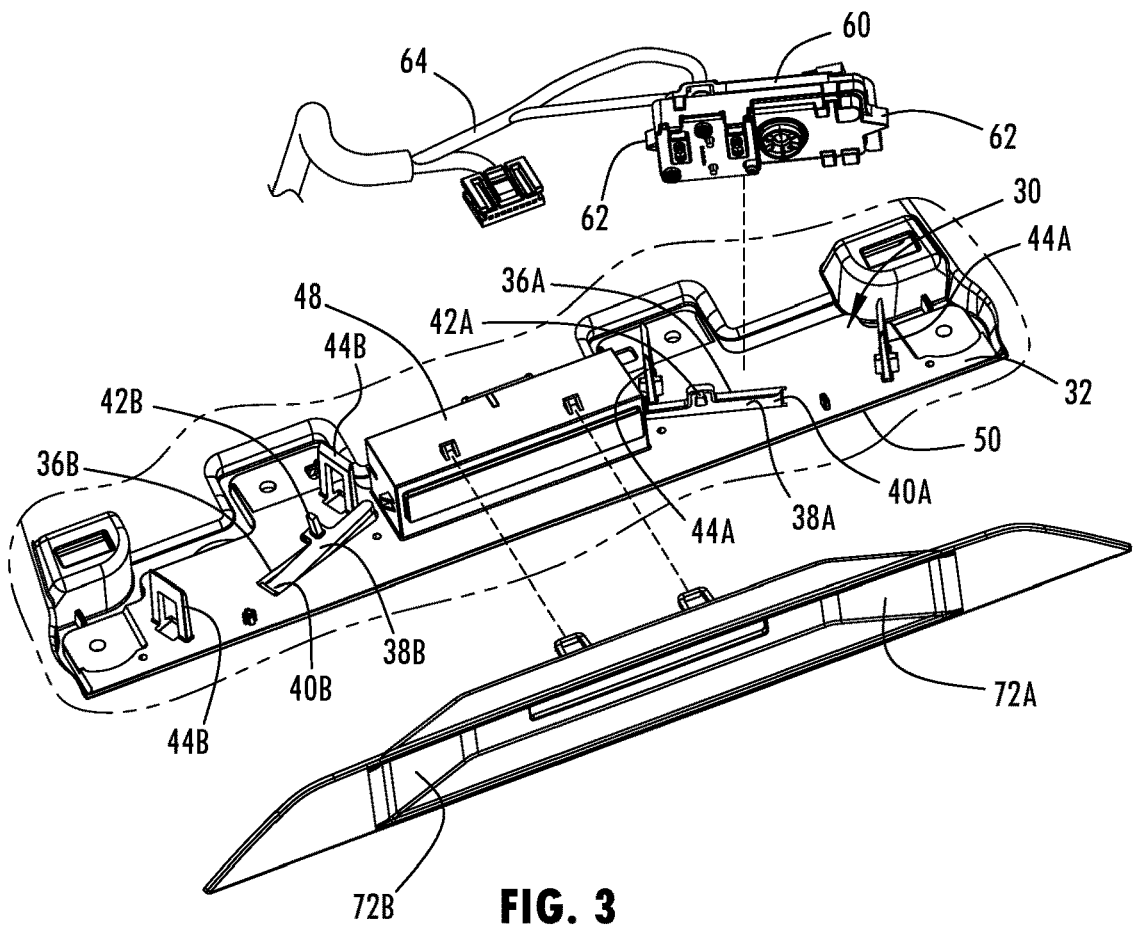
FIG. 3 is an exploded perspective view of the camera mount assembly further illustrating the camera arranged on the right side to monitor a left side driver.

The camera mount assembly 24 is further illustrated in FIG. 2 having a lens housing or shroud 70 with first and second lens portions 72A and 72B. The first lens portion 72A on the right side is shown positioned proximate the left side driver monitoring camera location 26 in front of a camera 60 and arranged to allow for image capture for the left side driver monitoring configuration. The second lens portion 72B is positioned proximate to the right side driver monitoring camera location 28 such that, when the camera 60 is mounted therein, the lens portion 72B is presented in front of the camera 60.

Referring to FIGS. 2-6, the camera mount assembly 24 is generally illustrated for a left side driver state camera monitoring configuration. The camera mount assembly 24 includes a carrier 30 that has a bottom panel 32 with universal mounting configurations for mounting a camera 60 on either the right side for a left side driver state monitoring camera or on the left side for a right side driver monitoring camera. As such, the carrier 30 is a universal camera mount carrier that may be used on either left side driver configured vehicles or right side driver configured vehicles. The carrier 30 includes a left side driver first camera mount 34A located on the right side and a right side driver second camera mount 34B located on the left side corresponding to the different vision angles required with left-hand side driver and right-hand side driver vehicles. The first camera mount 34A includes a first pair of connector features shown as spaced apart camera mount tabs 44A which are spaced apart and have an opening in the middle for receiving a pair of male projections 32 on opposite sides of the camera 60. The first pair of mount tabs 44A are resilient upstanding members with a receiver opening. As such, the camera 60 may be inserted into the first pair of camera mount tabs 44A, such that the camera mount tabs 44A flex to receive the angled surfaces of male projections 32 in the receiver opening and lock and hold the camera 60 in place. The first camera mount 34A also includes a first opening 36A formed in the panel 32 and a first finger 38A that extends from the panel 32 and is connected thereto at one end via a first living hinge 40A. As such, the first finger 38A may move up and down within the first opening 36A by pivoting about the first living hinge 40A. The first camera mount 34A further includes a first protrusion in the form of a post 42A that extends through the first finger 38A on the top and extends on the bottom side.

The second camera mount 34B includes a second pair of connector features shown as camera mount tabs 44B which are spaced apart and have a second opening 36B in the middle for receiving a pair of male projections 32 on opposite sides of the camera 60. The second pair of mount tabs 44B are resilient upstanding members with a receiver opening. As such, the camera 60 may be inserted into the second pair of camera mount tabs 44B, such that the camera mount tabs 44B flex and receive the angled surfaces of the male projections 32 in the receiver openings and lock and hold the camera 60 in place. The second camera mount 34B also includes a second opening 36B formed in the panel 32 and a second finger 38B that extends from the panel 32 and is connected thereto at one end via a second living hinge 40B. As such, the second finger 38B may move up and down within the second opening 36B by pivoting about the second living hinge 40B. The second camera mount 34B further includes a second projection in the form of a post 42B that extends through the first finger 38B on the top and extends on the bottom side. The features attached to each of the first and second living hinges 40A and 40B may be activated according to the desired camera location/orientation.

Figure 4:
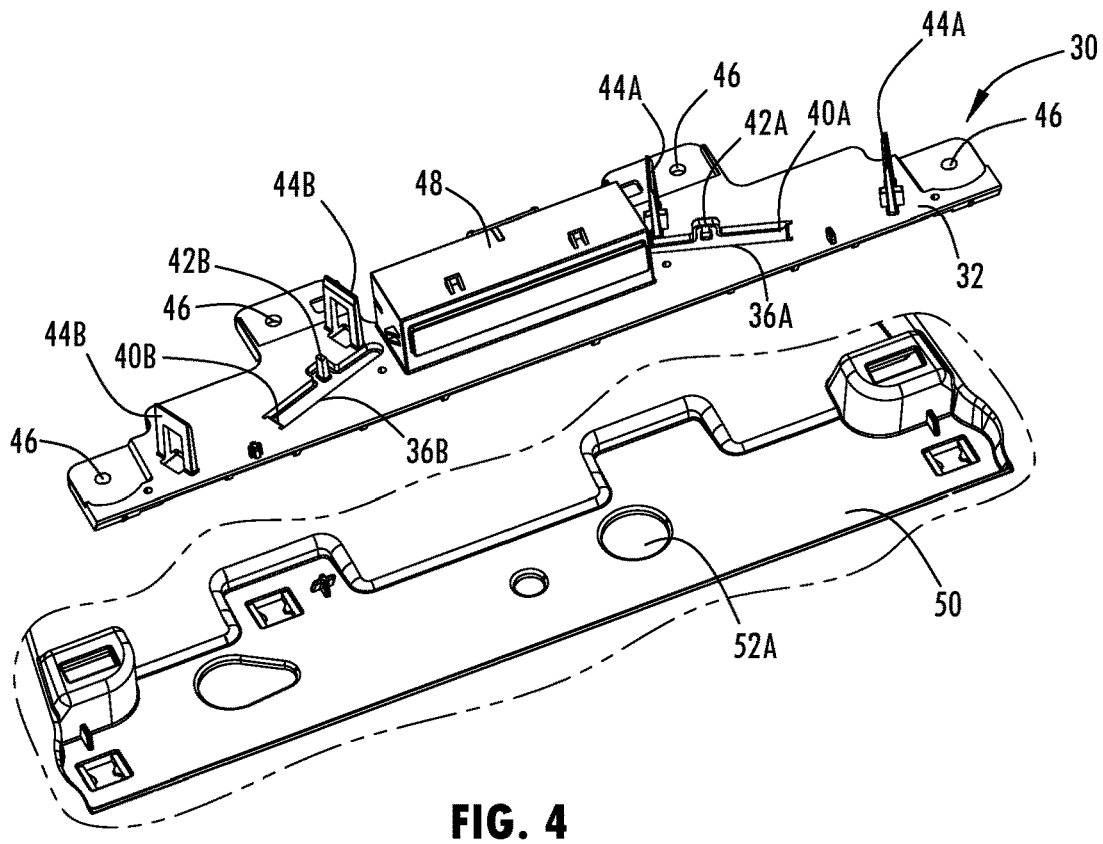
FIG. 4 is an exploded view of the camera mount assembly of FIG. 3 with the camera removed.
Figure 5:
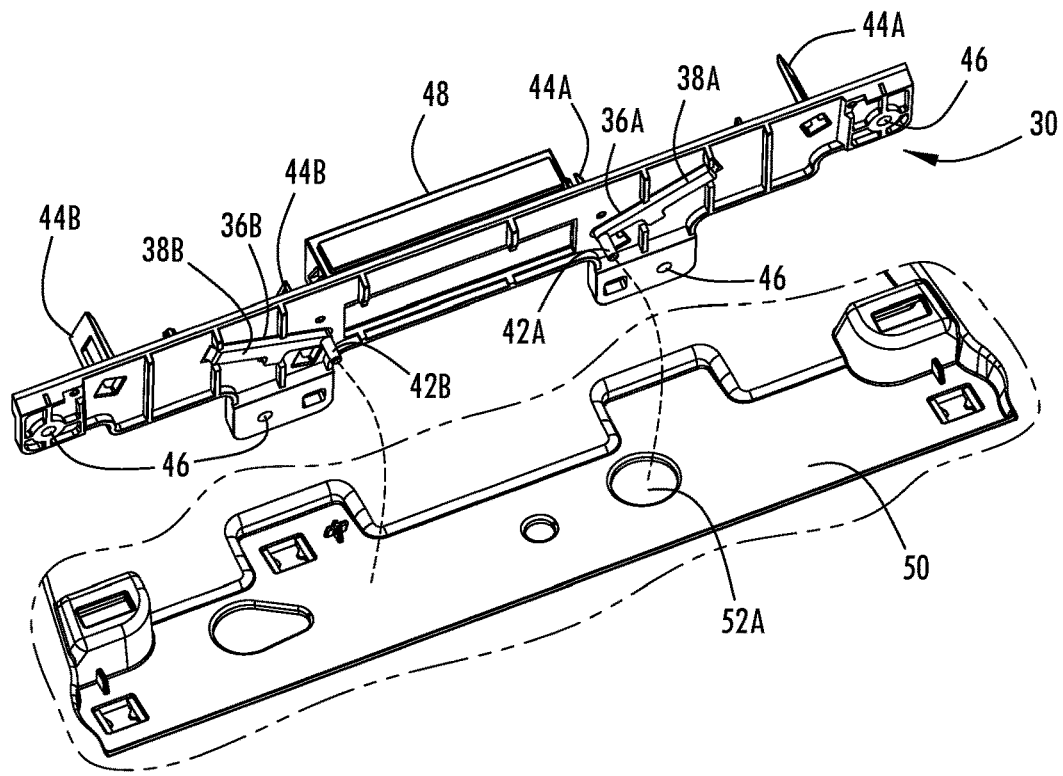
FIG. 5 is an exploded view of the camera mount assembly with the carrier rotated vehicle forward to show the underside.
Figure 6:
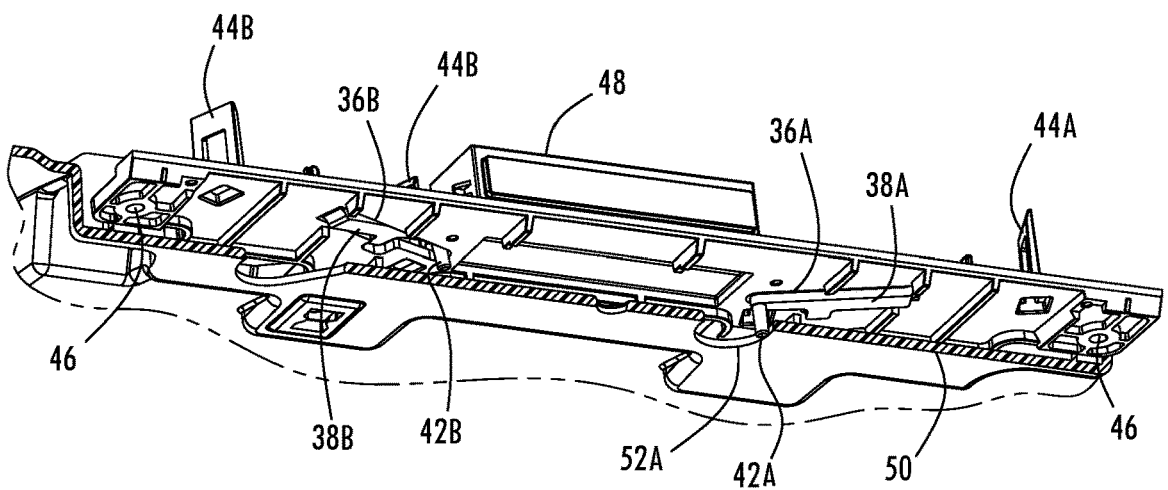
FIG. 6 is a lower perspective view of the carrier assembly.

The carrier 30 is shown located on top of a base 50 which may include a substantially planer platform that serves as a mounting surface as seen in FIG. 4. The base 50 includes a recess 52A which may be in the form of a hole or a recessed portion in the mounting surface of the base 50. The recess 52A is located proximate to one of the first and second camera mounts 34A and 34B in a location to receive one of the first and second posts 42A and 42B. The base 50 is configured with the recess 52A formed specific to one of the left side driver or right side driver monitoring camera arrangements. As seen in FIG. 4, the recess 52A is located generally below the first camera mount 34A in a location to enable the post 42A to extend into the recess 52A to allow the camera 60 to be mounted onto the first camera mount tabs 44A. Accordingly, during manufacturing assembly of the motor vehicle 10, the camera 60 may be installed onto the first camera mount tabs 44A such that the male member 62 engages the first pair of connectors 44A and the post 42A extends into the recess 52A to enable the first finger 38A to remain within the first opening 36A and allow the camera 60 to be mounted in the first camera mount 34A. It should be appreciated that if an assembler attempted to install the camera 60 on the second camera mount 34B, the second post 42B would interferingly engage the top surface of the base 50, since there is no recess located below the second post 42B. When this occurs, the second post 42B engaging the top surface of the base 50 will cause the second finger 38B to angle upwards with the second post 42B to be sticking up at the location proximate to the second camera mount 34B, thereby preventing the camera 60 from being able to engage and be installed onto the second pair of camera mount tabs 44B.

Figure 7:
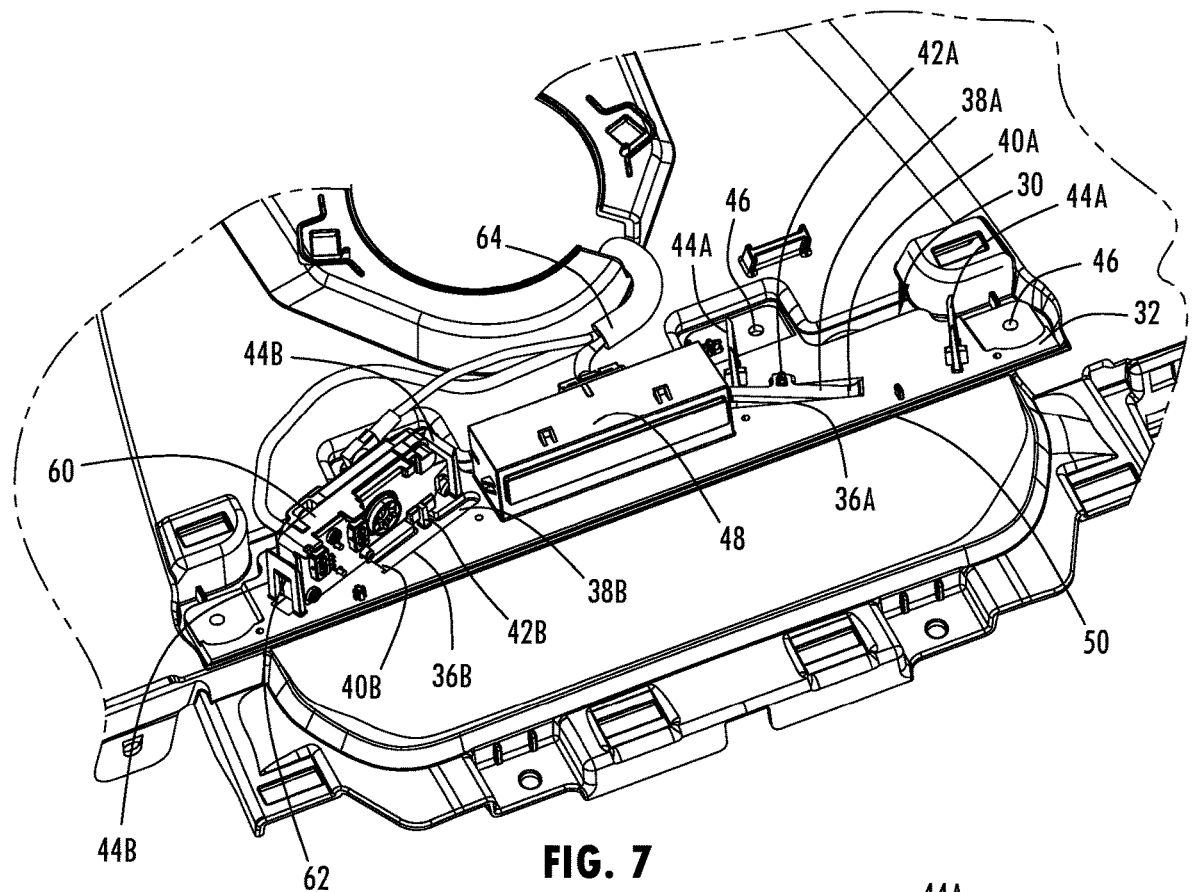
FIG. 7 is an upper perspective view of the camera mount assembly having a camera mounted for a right-hand driver monitoring system, according to another example.
Figure 8:
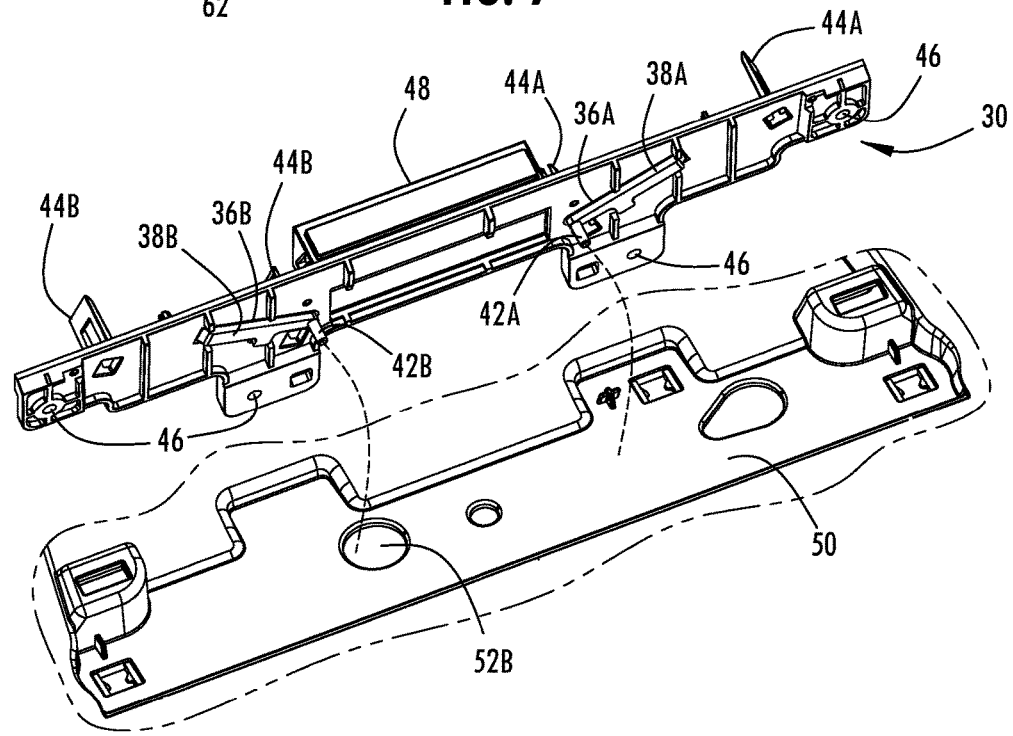
FIG. 8 is an exploded view of the camera mount assembly with the carrier rotated vehicle forward to show the bottom side for the camera arrangement shown in FIG. 7.

In the example shown in FIGS. 2-6, the camera 60 may be assembled only onto the first camera mount 34A to allow for left side driver state monitoring. In the event that the motor vehicle 10 is to be configured for a right side driver monitoring arrangement, the camera mount assembly 24 may utilize the same carrier 30 and shroud 70 and may simply utilize a different base 50 having the recess 52A located proximate to the second camera mount 34B as seen in FIGS. 7 and 8. In this configuration, the second post 52B is aligned with and extends into the recess 52B to allow the second finger 38B to remain within the second opening 36B and thereby allow the camera 60 to be assembled onto the second pair of mount tabs 44B within the second camera mount region 34B. In this configuration, the camera 60 may not be mounted onto the first camera mount 34A since the first post 42A engages the top surface of the base 50, causing the first finger 38A to extend above the first opening 36A and interfere with a camera attempting to be mounted thereto, thereby preventing the camera 60 from being in assembled into the first camera mount 34A.

Accordingly, the camera mount assembly 24 thereby provides for a universal mounting arrangement that may accommodate easy and efficient assembly of a driver state monitoring camera on left side driver configured vehicles and right side driver configured vehicles. The camera mount assembly 24 may utilize a substantial portion of the components including the carrier 30 and the shroud 70 for either the left side driver state monitoring or right side driver state monitoring camera configurations. In order to switch between the left and right side monitoring configurations, the arrangement of the recess 52A or 52B within the base 50 may be selected, thereby minimizing the complexity and preventing the incorrect installation of the camera 60 for either left or right side driver configured vehicles.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A camera mount assembly for a motor vehicle, the camera mount assembly comprising:
   a base configured to be installed on the vehicle and having a recess on a top surface;
   a carrier assembled above the base, the carrier having a first camera mount and a second camera mount, the first camera mount having a first protrusion extending on the bottom side, the second camera mount having a second protrusion extending on the bottom side; and
   a camera configured to be installed onto one of the first and second camera mounts, wherein the camera is received into one of the first and second camera mounts when a corresponding one of the first and second protrusions extends into the recess in the base, and wherein the other of the first and second protrusions contacts the base and prevents installation of the camera in the other of the first and second camera mounts.

2. The camera mount assembly of claim 1, wherein the first camera mount comprises a first opening having a first finger extending from the carrier within the opening and coupled to the first protrusion, and wherein the second camera mount comprises a second opening having a second finger extending from the carrier within the opening and coupled to the second protrusion.

3. The camera mount assembly of claim 2, wherein the first finger is connected to the carrier via a first living hinge, and the second finger is connected to the carrier via a second living hinge.

4. The camera mount assembly of claim 1, wherein the recess comprises a hole extending through the base.

5. The camera mount assembly of claim 1, wherein the recess extends below one of the first and second camera mounts and not below the other of the first and second camera mounts.

6. The camera mount assembly of claim 1, wherein the first camera mount comprises a first pair of connector features configured to receive the camera, and the second camera mount comprises a second pair of connector features configured to receive the camera mount.

7. The camera mount assembly of claim 1, wherein the camera mount assembly is assembled onto an instrument panel of the vehicle.

8. The camera mount assembly of claim 7, wherein the camera mount assembly is located on the instrument panel midway between first and second seat assemblies.

9. The camera mount assembly of claim 1, wherein the camera is a driver state monitoring camera.

10. A camera mount assembly for a motor vehicle, the camera mount assembly comprising:
- a base configured to be installed on the vehicle and having a recess on a top surface;
- a carrier assembled above the base, the carrier having a first camera mount and a second camera mount, the first camera mount having a first camera mount with a first protrusion extending on the bottom side, the second camera mount having a second camera mount with a second protrusion extending on the bottom side, and the first camera mount comprises a first opening having a first finger extending from the carrier within the opening and coupled to the first protrusion, wherein the second camera mount comprises a second opening having a second finger extending from the carrier within the opening and coupled to the second protrusion; and
- a driver state monitoring camera configured to be installed onto one of the first and second camera mounts, wherein the driver state monitoring camera is received into one of the first and second camera mounts when a corresponding one of the first and second protrusions extends into the recess in the base, wherein the other of the first and second protrusions contacts the base and prevents installation of the driver state monitoring camera in the other of the first and second camera mounts, and wherein the camera mount assembly located on an instrument panel of the vehicle.

11. The camera mount assembly of claim 10, wherein the first finger is connected to the carrier via a first living hinge, and the second finger is connected to the carrier via a second living hinge.

12. The camera mount assembly of claim 10, wherein the recess comprises a hole extending through the base.

13. The camera mount assembly of claim 10, wherein the recess extends below one of the first and second camera mounts and not below the other of the first and second camera mounts.

14. The camera mount assembly of claim 10, wherein the first camera mount comprises a first pair of connector features configured to receive the camera and the second camera mount comprises a second pair of connector features configured to receive the camera mount.

15. The camera mount assembly of claim 14, wherein the camera mount assembly is located on the instrument panel midway between first and second seat assemblies.

16. A method of assembling a camera on a camera mount on a vehicle, comprising:
- installing a base on the vehicle, the base having a recess on a top surface;
- assembling a carrier above the base, the carrier having a first camera mount and a second camera mount, the first camera mount having a first protrusion extending on the bottom side, the second camera mount having a second protrusion extending on the bottom side; and
- installing a camera onto one of the first and second camera mounts, wherein the camera is received into one of the first and second camera mounts when a corresponding one of the first and second protrusions extends into the recess in the base, and wherein the other of the first and second protrusions contacts the base and prevents installation of the camera in the other of the first and second camera mounts.

17. The method of claim 16, wherein the first camera mount comprises a first opening having a finger extending from the carrier within the opening and coupled to the first protrusion, and wherein the second camera mount comprises a second opening having a finger extending from the carrier within the opening and coupled to the second protrusion.

18. The method of claim 16, wherein the first finger is connected to the carrier via a first living hinge, and the second finger is connected to the carrier via a second living hinge.

19. The method of claim 16, wherein the camera mount assembly is assembled onto an instrument panel of the vehicle.

20. The method of claim 16, wherein the camera is a driver state monitoring camera.

\* \* \* \* \*